(12) United States Patent
Breuer et al.

(10) Patent No.: US 8,593,072 B2
(45) Date of Patent: Nov. 26, 2013

(54) CIRCUIT ASSEMBLY AND METHOD FOR OPERATING A HIGH PRESSURE DISCHARGE LAMP

(75) Inventors: Christian Breuer, Newburyport, MA (US); Andreas Huber, Maisach (DE); Bernhard Reiter, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 338 days.

(21) Appl. No.: 12/742,447

(22) PCT Filed: Nov. 13, 2007

(86) PCT No.: PCT/EP2007/062269
§ 371 (c)(1),
(2), (4) Date: May 12, 2010

(87) PCT Pub. No.: WO2009/062542
PCT Pub. Date: May 22, 2009

(65) Prior Publication Data
US 2010/0270934 A1    Oct. 28, 2010

(51) Int. Cl.
*H05B 37/02* (2006.01)
(52) U.S. Cl.
USPC .......................... 315/225; 315/226; 315/283
(58) Field of Classification Search
USPC ............. 315/209 R, 225, 226, 276, 283, 291
See application file for complete search history.

(56) References Cited

U.S. PATENT DOCUMENTS

| | | | |
|---|---|---|---|
| 5,523,405 A | 6/1996 | Mrowca | |
| 5,608,294 A * | 3/1997 | Derra et al. | 315/224 |
| 5,932,976 A | 8/1999 | Maheshwari et al. | |
| 6,278,244 B1 * | 8/2001 | Hevinga et al. | 315/291 |
| 6,329,761 B1 | 12/2001 | Melis et al. | |
| 6,714,100 B2 | 3/2004 | Matsumura et al. | |
| 7,187,244 B2 | 3/2007 | Ribarich et al. | |
| 7,274,157 B2 * | 9/2007 | Hirata et al. | 315/291 |
| 7,285,920 B2 * | 10/2007 | Riederer et al. | 315/246 |
| 7,323,827 B2 * | 1/2008 | Nerone | 315/247 |
| 7,443,103 B2 * | 10/2008 | Li et al. | 315/209 R |
| 7,923,940 B2 * | 4/2011 | Okawa | 315/224 |

(Continued)

FOREIGN PATENT DOCUMENTS

| | | |
|---|---|---|
| EP | 1549114 A1 | 6/2005 |
| EP | 1624733 A2 | 2/2006 |

(Continued)

OTHER PUBLICATIONS

English language abstract for JP 2004319193 A.

(Continued)

*Primary Examiner* — Thuy Vinh Tran

(57) ABSTRACT

A circuit arrangement for operating a high-pressure discharge lamp with an operating circuit for the high-pressure discharge lamp with an input for receiving a switch-on/switch-off signal for the high-pressure discharge lamp and at least one output for providing an operating signal to the high-pressure discharge lamp, wherein the operating circuit is designed to reduce the power of the operating signal provided at the at least one output once a switch-off signal has been received at its input, wherein the operating circuit furthermore designed to provide the operating signal as an AC signal above a predeterminable power threshold value and as a quasi DC signal below the predeterminable power threshold value.

9 Claims, 3 Drawing Sheets

(56) References Cited

U.S. PATENT DOCUMENTS

| | | |
|---|---|---|
| 2002/0135324 A1 | 9/2002 | Fujii et al. |
| 2003/0160577 A1 | 8/2003 | Noguchi et al. |
| 2007/0159445 A1 | 7/2007 | Nakagawa et al. |
| 2007/0182344 A1* | 8/2007 | De Brouwer et al. ......... 315/291 |
| 2010/0026211 A1 | 2/2010 | Breuer et al. |

FOREIGN PATENT DOCUMENTS

| | | |
|---|---|---|
| JP | 11501919 A | 2/1999 |
| JP | 2003109845 A | 4/2003 |
| JP | 2004265717 A | 9/2004 |
| JP | 2004319193 A | 11/2004 |
| JP | 2005050662 A | 2/2005 |
| JP | 2006520129 A | 8/2006 |
| JP | 2006331872 A | 12/2006 |
| WO | 9535645 A1 | 12/1995 |
| WO | 04002200 A1 | 12/2003 |
| WO | WO 2004064409 A1 * | 7/2004 |
| WO | 2006051926 A1 | 5/2006 |
| WO | 2007096803 A1 | 8/2007 |
| WO | 2008071232 A1 | 6/2008 |

OTHER PUBLICATIONS

International Search Report of PCT/EP2007/062269 mailed on Jul. 31, 2008.
English language abstract for JP 2004265717A.
English language abstract for JP 2005050662A.
English language abstract for JP 2006331872A.

* cited by examiner

CIRCUIT ASSEMBLY AND METHOD FOR OPERATING A HIGH PRESSURE DISCHARGE LAMP

RELATED APPLICATIONS

The present application is a national stage entry according to 35 U.S.C. §371 of PCT application No.: PCT/EP2007/062269 filed on Nov. 13, 2007.

TECHNICAL FIELD

Various embodiments relate to a circuit arrangement for operating a high-pressure discharge lamp with an operating circuit for the high-pressure discharge lamp with an input for receiving a switch-on/switch-off signal for the high-pressure discharge lamp and at least one output for providing an operating signal to the high-pressure discharge lamp. Various embodiments furthermore relate to a method for operating a high-pressure discharge lamp using such a circuit arrangement.

BACKGROUND

The present invention in particular relates to the problem of restarting high-pressure discharge lamps, as are used in particular in rear-projection televisions and projectors. After shutdown, such high-pressure discharge lamps require a cooling phase before they can be successfully restarted. As a result, they cannot be switched on again after shutdown as quickly as users of conventional televisions are accustomed to. In the prior art, therefore, such high-pressure discharge lamps are cooled after shutdown for a certain time before a renewed starting attempt is made. The cooling phase generally lasts between 30 seconds and 3 minutes. This long restarting time is particularly undesirable in the case of rear-projection televisions.

US 2002/0135324 A1 has disclosed a method for operating a discharge lamp operated on direct current. The cited document deals with the problem that, when a discharge lamp is switched off, the mercury which has evaporated during operation condenses on one of the two electrodes of the discharge lamp and, as a result, the risk of a short circuit with the other electrode increases. As a solution to this, the cited document proposes cooling the lamp by withdrawing the power in order to thus ensure that the mercury condenses at another point than on the electrode.

As further prior art, mention is made of JP 2004-319193 and JP 2003-109845.

SUMMARY

Various embodiments develop a circuit arrangement as mentioned at the outset or a method as mentioned at the outset in such a way that, as a result, a shorter restarting time is made possible.

Various embodiments are based on the knowledge that it is possible to achieve the above effect if the lamp is transferred to a type of standby mode prior to actual shutdown. In this standby mode the discharge lamp is operated at a lower power than during normal operation, as a result of which the discharge lamp is cooled further gradually, possibly assisted by cooling by means of a fan. At the end of this standby mode, the lamp has preferably been cooled to a temperature at which it can be restarted immediately after actual shutdown. During the standby mode, the lamp be run us again quickly at an time. In the ideal case, there is thus no longer a time at which the lamp cannot be brought back into operation immediately.

However, in the case of a discharge lamp which is operated during normal operation using an AC signal, the power cannot be reduced to any desired extent, in particular cannot be reduced to a power which would result in such cooling of the discharge lamp, with the result that said lamp could be restarted immediately after a shutdown. This is not possible because the lamp arc is extinguished below a certain power threshold. The present invention is therefore furthermore based on the knowledge that, during operation of a discharge lamp with an AC signal, both electrodes need to remain above the thermal emission temperature in order to prevent the lamp arc from being extinguished. The inventors of the present invention have identified that operation of the high-pressure discharge lamp without the lamp arc being extinguished is possible down to even lower powers if essentially only one electrode is emitting, i.e. if the AC discharge lamp is operated with a quasi DC signal below a predeterminable power threshold value. A quasi DC signal in the meaning of the present invention is a signal which substantially represents a DC signal, in particular for example also a pure DC signal. In other words, the lamp could be fed from a separate DC source below a predeterminable power threshold value, instead of from the AC source provided for normal operation. However, a particularly elegant and inexpensive solution is one in which the AC source provided for normal operation is driven in a suitable manner in such a way that a quasi DC signal is provided to the discharge lamp at the output of said AC source. This signal acts as DC signal for the discharge lamp, but certain compromises are allowed as regards the generation of said DC signal from a subcircuit which is normally provided for implementing an AC source.

Thus, the operating circuit can comprise a bridge circuit with at least a first electronic switch and a second electronic switch, the operating circuit furthermore comprising a drive circuit for at least the first electronic switch and the second electronic switch, the drive circuit being designed to drive the at least first electronic switch and second electronic switch in such a way that the bridge circuit provides at least the AC signal at its output. As already mentioned, the operating circuit could comprise an AC voltage source, with the operating circuit being designed to couple the output to the DC voltage source below the predeterminable power threshold value. However, the drive circuit could also be designed to drive at least the first electronic switch and the second electronic switch in such a way that the bridge circuit also provides the quasi DC signal at its output. In this case, no separate DC voltage source would need to be provided.

If a full bridge is used as the bridge circuit, with the high-pressure discharge lamp being arranged in the bridge branch, diagonally positioned switches are switched simultaneously. In this case, the full bridge is fed by a DC voltage source, in particular from the so-called intermediate circuit voltage. The DC voltage source is coupled to the high-pressure discharge lamp by the simultaneous switching of the diagonally positioned switches with alternating polarity. A commutation comprises switching off the switches positioned in one diagonal and switching on the switches positioned in the other diagonal. Two switches positioned next to one another are coupled to the negative terminal of the DC voltage source and the other two switches are coupled to the positive terminal. The negative terminal generally represents the reference potential of the circuit arrangement. The switches coupled to the negative terminal can therefore usually be driven without any problems. The switches coupled to the positive terminal are referred to as high-side switches and can be driven in a complicated, but known manner.

Accordingly, the drive circuit comprises a low-side driver for the switches coupled to the negative terminal and a high-side driver for the switches coupled to the positive terminal, the low-side driver and the high-side driver having in each case one output for coupling to the respective switch, in each case one control input for coupling to a control apparatus and in each case one supply terminal for coupling to a terminal for connecting a supply voltage, a charge pump, in particular a capacitor, being associated with the high-side driver, said charge pump being coupled between the supply terminal and the center point between the first electronic switch and the second electronic switch.

Preferably, in this case the charge pump furthermore comprises a diode, which is coupled between the capacitor and the supply voltage terminal in such a way that a current flow from the capacitor to the supply voltage terminal is prevented.

In this case, it is particularly preferred if the drive circuit is designed to provide the quasi DC signal by implementing pseudo-commutations. This means two commutations in quick succession, with the first commutation being so short that it is more or less suppressed. For example, in a preferred exemplary embodiment, a full bridge branch switches on for 5 µs, and the other full bridge branch switches on for 15 ms. The first short commutation can barely be identified in the lamp current, is quasi suppressed, since the current cannot reverse its direction of flow anywhere near as quickly as a result of the output capacitance and inductance of the starting circuit. A DC signal is therefore supplied to the lamp. However, the short commutation is sufficient for recharging the capacitor of the charge pump. A typical commutation during normal operation lasts for approximately 50 µs in a preferred exemplary embodiment. The ratio between the short and long commutations for implementing a quasi DC signal is preferably in the range of between 1:500 and 1:10000.

Such commutations are described, although in a completely different context, in the application PCT/EP2006/069665 by the applicant, dated Dec. 13, 2006, the disclosure content of said document having being incorporated by reference in the disclosure of the present application.

Preferably, the drive circuit is designed to perform the pseudo-commutations at a frequency of between 50 Hz and 1 kHz, preferably 500 Hz. As a result, firstly a sufficient supply of energy to the electrode of the high-pressure discharge lamp which acts as anode can be ensured, with the result that the emission temperature continues to be exceed and the lamp arc does not extinguish. Secondly, cooling of the lamp can be achieved, which makes it possible for the high-pressure discharge lamp to be restarted directly after the shutdown operation of the high-pressure discharge lamp. Finally, by virtue of such a frequency of pseudo-commutations, sufficient recharging of the capacitor of the charge pump can be ensured.

Further preferably, the drive circuit is designed to store, in the event of shutdown, the polarity during the last quasi DC operating mode, the drive circuit furthermore being designed to use the other polarity for the quasi DC operating mode in the event of the next shutdown. As a result, uniform loading of the electrodes of the lamp can be ensured. Further preferably, the drive circuit 40 comprises a time measurement apparatus 50 (See FIG. 5), the drive circuit furthermore being designed to adjust the operation of the high-pressure discharge lamp, i.e. to shut down the high-pressure discharge lamp once a predeterminable period of time has elapsed, in which time the high-pressure discharge lamp was operated with a quasi DC signal with a predeterminable power. Alternatively, a temperature measurement apparatus can also be used which determines whether the high-pressure discharge lamp has cooled to a temperature which enables immediate restarting. By virtue of the time measurement apparatus and/or the temperature measurement apparatus, the phase in which the high-pressure discharge lamp is operated at a relatively low power but energy is nevertheless consumed is minimized.

The preferred embodiments proposed with reference to a circuit arrangement according to the invention and the advantages thereof are also true, if applicable, for the method according to the invention.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
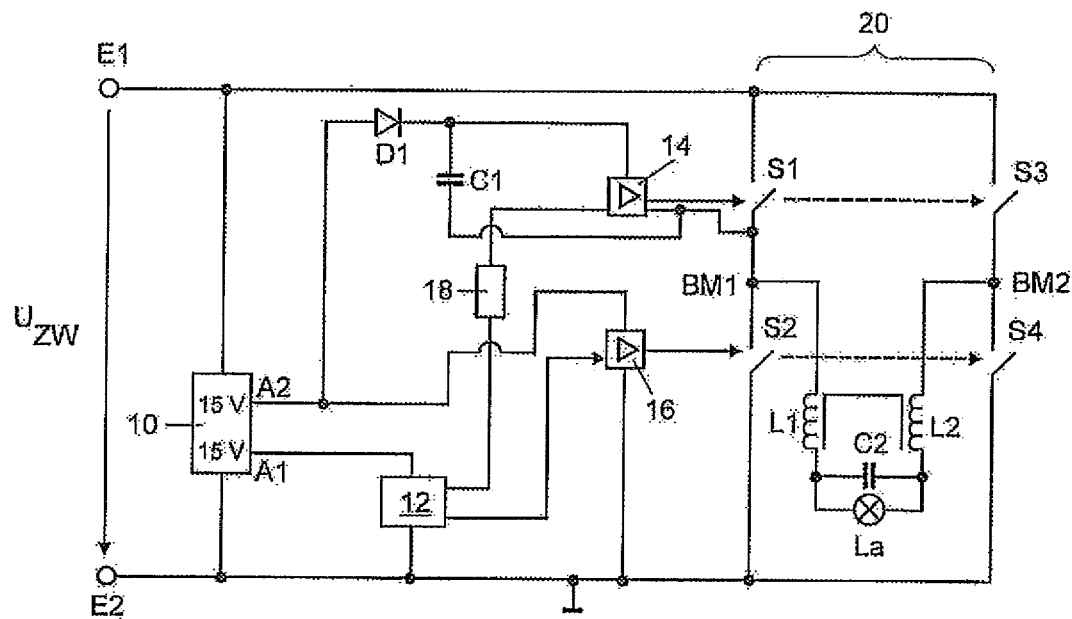
FIG. 1 shows a schematic illustration of the design of a circuit arrangement according to the invention.

FIG. 1 shows a schematic illustration of an exemplary embodiment of a circuit arrangement according to the invention. Said circuit arrangement comprises a first input terminal E1 and a second input terminal E2, between which a DC voltage can be connected, preferably the so-called intermediate circuit voltage, which is of the order of magnitude of between 300 and 400V. A DC low-voltage supply unit 10 is connected between the input terminals E1, E2 and provides a DC voltage of 5 V to a microcontroller 12 at a first output A1 and a DC voltage of 15 V to a high-side driver 14 and a low-side driver 16 at a second output A2. The microcontroller 12 drives the low-side driver 16 directly and the high-side driver 14 via a potential isolation unit 18.

A charge pump, which comprises a diode D1 and a capacitor C1, is coupled between the output A2 of the DC low-voltage supply unit 10 and the high-side driver 14. The capacitor C1 is connected to an AC voltage source, which in this case represents the bridge center point BM1 of a bridge circuit 20. The potential of the bridge center point BM1 is supplied to the high-side driver 14 as reference potential, while the low-side driver 16 is provided with the ground potential, which represents the potential at the input terminal E2, as reference potential.

The bridge circuit 20 comprises four electronic switches S1, S2, S3, S4, wherein, during operation, the switches in the diagonal S1, S4 are simultaneously opened in a known manner while the switches in the other diagonal S2, S3 are closed, and vice versa. A high-pressure discharge lamp La is coupled between the two bridge center points BM1, BM2 via a starting circuit, which comprises two inductances L1, L2, which are coupled to one another, and a capacitor C2.

The high-side driver 14 serves the purpose of driving the switches S1, S3, while the low-side driver 16 serves the purpose of driving the switches S2, S4.

The bridge center point BM1 accordingly changes its potential depending on the position of the switches S1, S2 between 0 V and $U_{zw}$. It is possible for the capacitor C1 to be recharged for supplying the high-side driver 14 if the bridge center point BM1 is at ground potential, i.e. the switch S2 is closed and the switch S1 is open.

In order to provide a DC signal to the discharge lamp La, in each case two successive commutations are replaced by two commutations performed in quick succession, so-called pseudo-commutations, a plurality of times in succession. As a result, a DC signal is supplied to the lamp La, since the lamp current cannot change its direction anywhere near quick enough as a result of the output capacitance and inductance of the starting circuit. Only a short-term dip in the amplitude of the lamp current can be established.

In an embodiment which is not illustrated, instead of implementing pseudo-commutations, a DC signal is supplied to the lamp La via a switched mode power supply and a rectifier as soon as the power supplied to the lamp has been reduced to such an extent that there is the risk of the lamp arc being extinguished during operation of the lamp with an AC signal.

Figure 2:
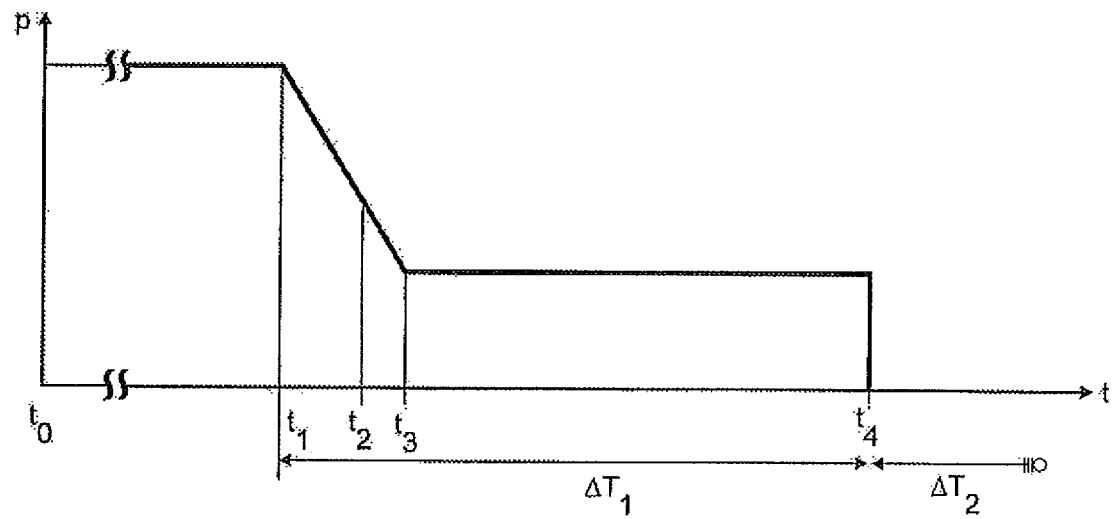
FIG. 2 shows the time profile of the power supply of the high-pressure discharge lamp.

FIG. 2 shows a schematic illustration of the time profile of the power P which is supplied to the high-pressure discharge lamp La. Between the times $t_0$ and $t_1$, the lamp is operated at 100% power during normal operation. At time $t_1$, the operator could switch off the projector in which the high-pressure discharge lamp La is fitted. A corresponding signal is supplied to the microcontroller 12 via an interface (not illustrated in FIG. 1), whereupon the circuit arrangement according to the invention begins to reduce the power supplied to the lamp La. Between the times $t_0$ and $t_2$, the high-pressure discharge lamp La is operated with an AC signal. At time $t_2$, i.e. when a power threshold at which there is the risk of the lamp arc being extinguished during continued operation with an AC signal is reached, the system is switched over from AC operation to quasi DC operation. For this purpose, the high-pressure discharge lamp La is operated with so-called pseudo-commutations. The power supplied to the lamp is in this case further reduced until, at time $t_3$, the so-called standby operating mode has been reached, in which the lamp is operated with pseudo-commutations with a frequency of the order of magnitude of 500 Hz in order to ensure that the capacitor C1 is recharged to a sufficient extent to thereby ensure proper operation of the high-side driver 14. Between times $t_3$ and $t_4$, the lamp is operated at approximately 20% of its rated power. As a result, the lamp continues to be cooled, with the result that, at time $t_4$, which is determined either by inputting the time period $t_1$ to $t_4$ or by measuring the lamp temperature, said lamp has reached a temperature which enables immediate successful restarting after a shutdown operation. If, alternatively, the temperature is measured, the time $t_4$ is established by virtue of the fact that the lamp has called to a predeterminable temperature, for example 350° C. or less.

Accordingly, the high-pressure discharge lamp La can be run up at any time immediately to 100% again in the time window $\Delta T_1$ if an operator so requires. At time $\Delta T_2$, the lamp La can be restarted immediately successfully if an operator so requires. There is therefore no longer a time at which the lamp La could not be switched on again immediately.

Figure 3:
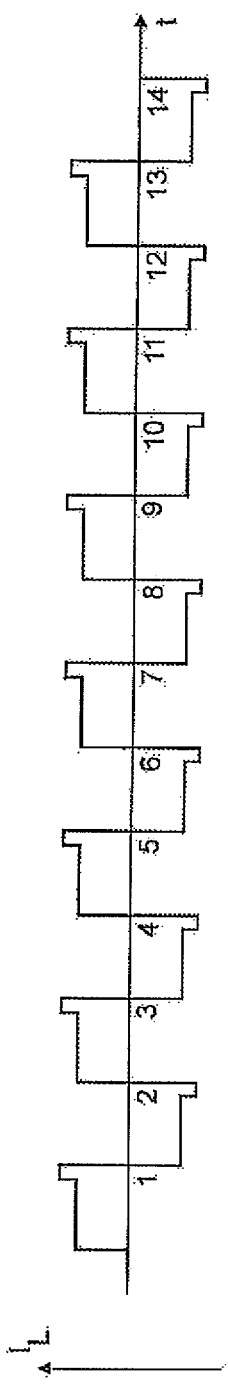
FIG. 3 shows the time profile of the lamp current without pseudo-commutations.

FIG. 3 shows the time profile of the lamp current without any pseudo-commutations taking place. The commutations are numbered by numerals 1 to 14. Directly prior to a commutation, the lamp current is increased in pulsed fashion. This is a measure for reducing instability phenomena, in particular flicker and arc jumps, as is described in the document WO 95/35645, for example. This measure is independent of the implementation of pseudo-commutations in accordance with an aspect of the present invention. The frequency of the square-wave profile of the current is generally between 200 Hz and 5 kHz.

Figure 4:
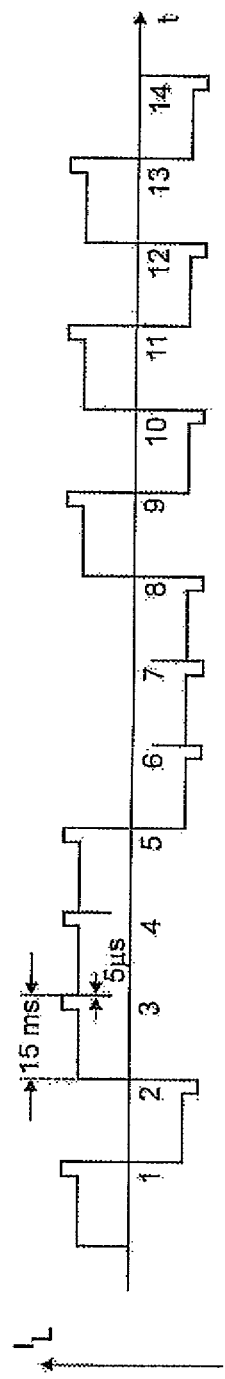
FIG. 4 shows the time profile of the lamp current with pseudo-commutations.
Figure 5:
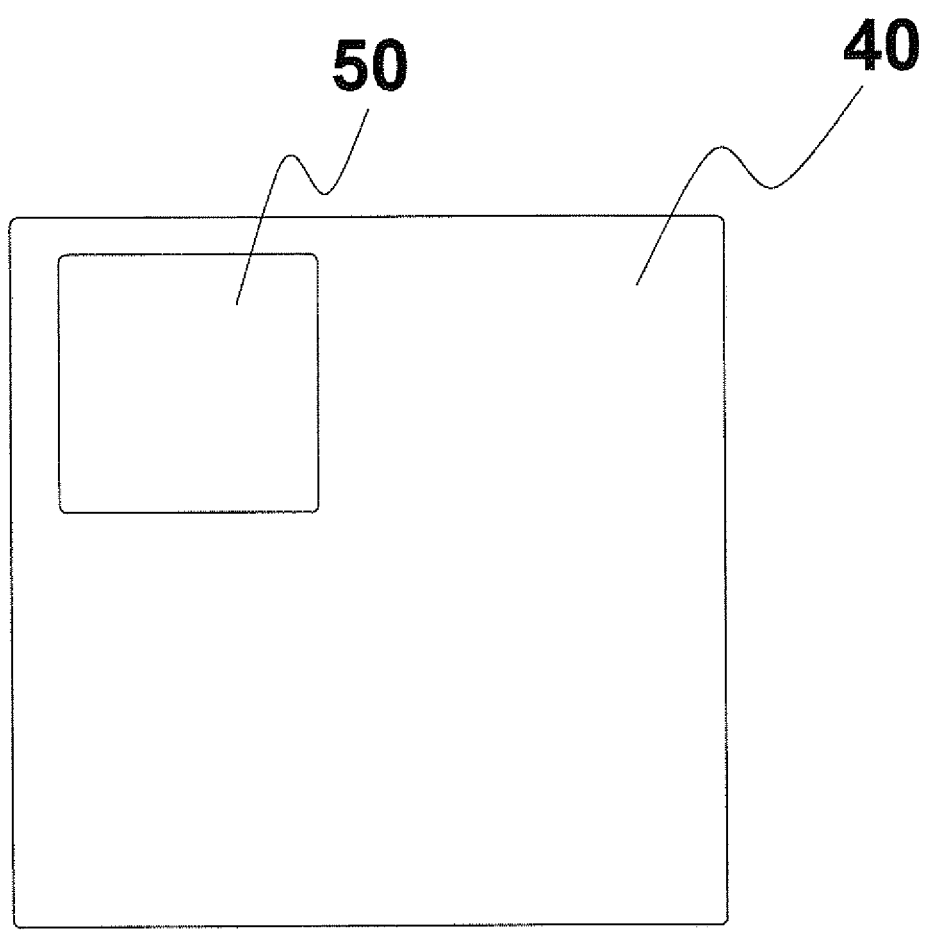
FIG. 5 shows a drive circuit comprising a time measurement apparatus.

It can be seen from FIG. 4 that the commutations 3, 4 and 6, are implemented for a very short period of time by the microcontroller 12. In this case, a long commutation is 15 ms, and a short commutation is only 5 µs. The latter is barely perceptible in the lamp current $I_L$ since the current cannot reverse its direction of flow anywhere near as quickly owing to the output capacitance and inductance of the starting circuit. A DC signal is therefore supplied to the lamp. However, the short commutation is sufficient for recharging the capacitor of the charge pump. A typical commutation during normal operation lasts approximately 50 µs in a preferred exemplary embodiment, however.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit arrangement for operating a high-pressure discharge lamp with an operating circuit for the high-pressure discharge lamp with an input for receiving a switch-on/switch-off signal for the high-pressure discharge lamp and at least one output for providing an operating signal to the high-pressure discharge lamp, wherein the operating circuit is configured to reduce the power of the operating signal provided at the at least one output once a switch-off signal has been received at its input, wherein the operating circuit furthermore is configured to provide the operating signal as an AC signal above a predetermined power threshold value and as a quasi DC signal below the predetermined power threshold value wherein the operating circuit comprises a drive circuit, the drive circuit is configured to store, in the event of shutdown, a polarity during a last quasi DC operating mode, the drive circuit furthermore being configured to use the other polarity for the quasi DC operating mode in the event of the next shutdown, wherein the drive circuit comprises a low-side driver and a high-side driver for at least a first electronic switch and a second electronic switch, the low-side driver and the high-side driver having in each case one output for coupling to the respective electronic switch, in each case one control input for coupling to a control apparatus and in each case one supply terminal for coupling to a terminal for connecting a supply voltage, a capacitor being associated with said high-side driver, said capacitor being coupled between the supply terminal and a center point between the first electronic switch and the second electronic switch.

2. The circuit arrangement as claimed in claim 1, wherein the operating circuit comprises a bridge circuit with at least a first electronic switch and a second electronic switch, and wherein the drive circuit is configured to drive the at least first electronic switch and second electronic switch in such a way that the bridge circuit provides at least the AC signal at its output.

3. The circuit arrangement as claimed in claim 2, wherein the drive circuit is furthermore configured to drive at least the first electronic switch and the second electronic switch in such a way that the bridge circuit also provides the quasi DC signal at its output.

4. The circuit arrangement as claimed in claim 3, wherein the drive circuit is configured to provide the quasi DC signal by virtue of the temporal shortening of commutations.

5. The circuit arrangement as claimed in claim 1, wherein the drive circuit furthermore comprises a diode, which is coupled between the capacitor and the supply voltage terminal in such a way that a current flow from the capacitor to the supply voltage terminal is prevented.

6. The circuit arrangement as claimed in claim 1, wherein the drive circuit is configured to perform the pseudo-commutations at a frequency of between 50 Hz and 1 kHz.

7. The circuit arrangement as claimed in claim 6, wherein the drive circuit is configured to perform the pseudo-commutations at a frequency of 500 Hz.

8. The circuit arrangement as claimed in claim 1, wherein the drive circuit furthermore comprises a time measurement apparatus, the drive circuit furthermore being configured to adjust the operation of the high-pressure discharge lamp once a predetermined period of time has elapsed, in which time the high-pressure discharge lamp was operated with a quasi DC signal with a predetermined power.

9. A circuit arrangement for operating a high-pressure discharge lamp with an operating circuit for the high-pressure discharge lamp with an input for receiving a switch-on/switch-off signal for the high-pressure discharge lamp and at least one output for providing an operating signal to the high-pressure discharge lamp, wherein the operating circuit is configured to reduce the power of the operating signal provided at the at least one output once a switch-off signal has been received at its input, wherein the operating circuit furthermore is configured to provide the operating signal as an AC signal above a predetermined power threshold value and configured to couple the output to a DC signal from a separate source below the predetermined power threshold value, wherein the operating circuit comprises a drive circuit, the drive circuit is configured to store, in the event of shutdown, a polarity during a last quasi DC operating mode, the drive circuit furthermore being configured to use the other polarity for the quasi DC operating mode in the event of the next shutdown, wherein the drive circuit comprises a low-side driver and a high-side driver for at least a first electronic switch and a second electronic switch, the low-side driver and the high-side driver having in each case one output for coupling to the respective electronic switch, in each case one control input for coupling to a control apparatus and in each case one supply terminal for coupling to a terminal for connecting a supply voltage, a capacitor being associated with said high-side driver, said capacitor being coupled between the supply terminal and a center point between the first electronic switch and the second electronic switch.

* * * * *